March 5, 1935.   R. S. NELSON   1,993,378
ABSORPTION REFRIGERATING APPARATUS
Filed July 17, 1933
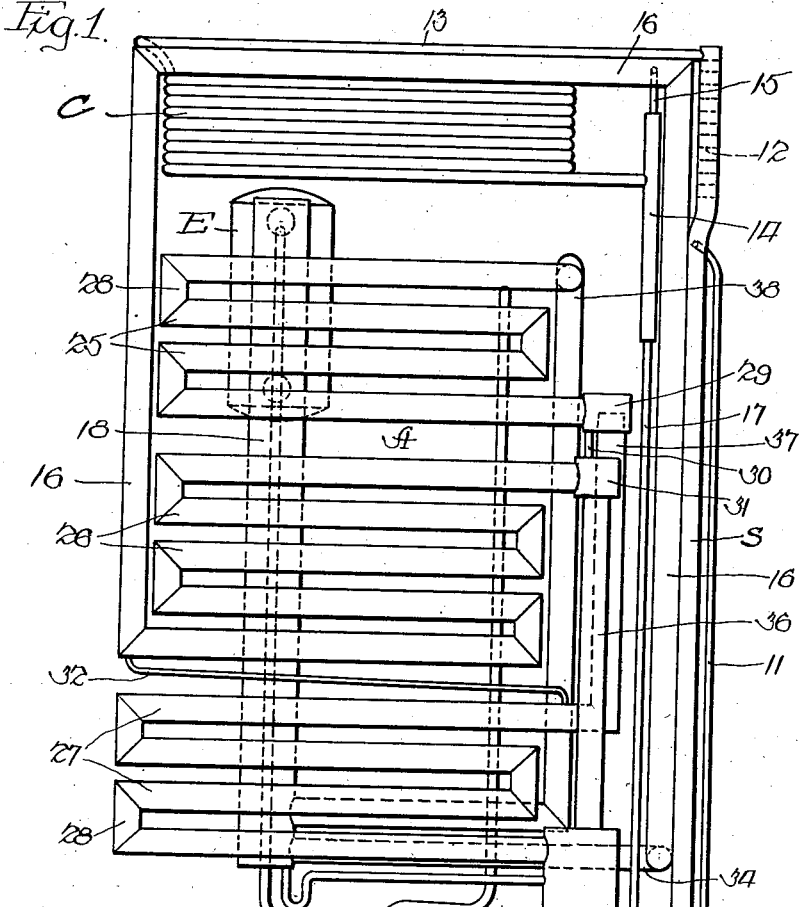
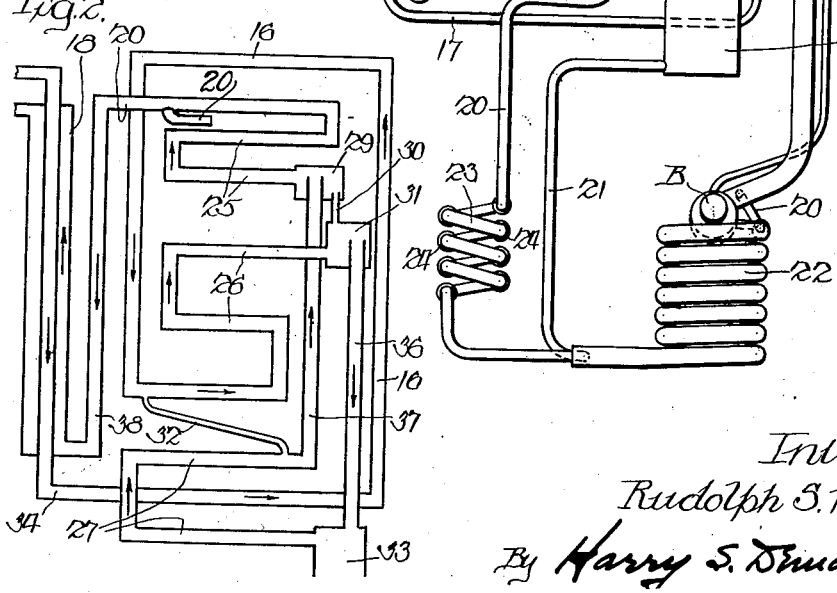
Inventor:
Rudolph S. Nelson.
By Harry S. Dumarse Atty.

Patented Mar. 5, 1935

1,993,378

UNITED STATES PATENT OFFICE 1,993,378

ABSORPTION REFRIGERATING APPARATUS

Rudolph S. Nelson, Rockford, Ill., assignor to The Hoover Company, North Canton, Ohio, a corporation of Ohio Application July 17, 1933, Serial No. 680,751

7 Claims. (Cl. 261—21)

This invention relates to the absorption refrigerating apparatus and more particularly to the construction of the absorber thereof.

In my copending application Serial No. 680,749 filed July 17, 1933 various types of absorbers are disclosed and claimed, the claims of that case being generic to the invention herein disclosed. Various absorbers similar to that herein disclosed are also disclosed and claimed in my copending application Serial No. 680,750 filed July 17, 1933.

It is an object of the present invention to provide a multiple part absorber suitable for use in continuous absorption refrigerating systems so arranged as to more effectively cause gas supplied thereto to be absorbed in the absorption liquid this being accomplished by the novel manner in which the heat is discharged from the absorber and by the manner in which the gas and liquid are brought to contact in various parts thereof.

It is a further object of the invention to provide an absorber particularly adapted for continuous absorption refrigerating apparatus using an inert gas for conveying the refrigerant gas to be absorbed to the absorber, the arrangement being such that the inert gas contains a minimum of refrigerant gas at the point where it leaves the absorber and wherein the absorption liquid is as rich as possible at the point where it leaves the absorber, taking into consideration the temperature available for cooling the absorber.

It is a further object of the invention to provide an absorber for absorption refrigerating systems which is air-cooled and which occupies a small space.

Other objects and advantages reside in certain novel features in the arrangement and construction of parts as will be apparent from a consideration of the following description taken in connection with the accompanying drawing, in which;

Figure 1 is a view in elevation of one embodiment of the invention showing how it is incorporated in an absorption refrigerating system and Figure 2 is a diagram of the absorber shown in Fig. 1, together with the associated parts.

Referring to the drawing in detail, an absorption refrigerating system of the type which uses an inert gas is shown as consisting of a boiler B, gas separating chamber S, a condenser C, an evaporator E and an absorber A as essential elements, these parts being connected by suitable conduits as shown to make up a complete refrigerating system.

As now well known in the art the system may be changed with ammonia as refrigerant, water as absorbent and hydrogen as inert gas.

The boiler B is connected to the gas separating chamber S by a conduit 11 which acts as a gas lift pump in accordance with principles now well known to those skilled in the absorption refrigeration art.

The upper portion of the gas separating chamber S is provided with a number of small baffle plates 12 which cause this portion of the separator to act as a rectifier. Above the baffle plates 12 conduit 13 connects chamber S with the condenser C. The lower portion of the condenser is connected to a small vessel 14 which has the conduit 15 at the upper end thereof connected to the gas pipe 16 which will vent inert gas which may have found its way into the condenser, back into the pipe 16. At the lower end of the vessel 14 a U-shaped pipe 17 is connected, this pipe passing downwardly, then partly across the unit and upwardly through the gas heat exchanger 18 into the top of the evaporator E.

The lower portion of the gas separation chamber S is connected by means of the conduit 20 with the top of the absorber A, the conduit 20 passing in heat exchange relation with the conduit 21 coming from the absorber in the coil 22. The conduit 20 also has a portion of its length formed into a coil 23 provided with heat radiating fins 24 which pre-cool the absorption liquid on its way to the absorber.

The feature of the invention claimed particularly in this application resides in the construction of the absorber and the associated parts. As shown in elevation in Figure 1 and as diagrammatically shown in Figure 2 the absorber consists of three parts designated 25, 26 and 27 respectively. Each of these parts consist of a number of horizontal pipes joined by short vertical sections indicated at 28. Absorption liquid flows by gravity through these pipes. As noted above, the conduit 20 supplies absorption liquid to the top pipe of the upper section 25. After flowing downwardly through the conduits therein it passes into a sump designated 29 from which it flows through the short conduit 30 into a second sump 31 which is connected to the upper pipe of the section 26 of the absorber. After flowing downwardly through the pipes in the section 26 the absorption liquid passes through a conduit 32 into the top pipe of the lower section 27. The lower pipe of the section 27 is connected to a vessel 33 which acts as a reservoir, and which has its lower end connected with the pipe 21 which conveys the absorption liquid back to the boiler.

The absorber is connected to the evaporator by means of gas conduits so that inert gas may circulate between the evaporator and the absorber. The inert gas leaves the top of the evaporator and flows downwardly through the heat exchanger 18, passing from the bottom of the heat exchanger through the conduit 34 to the right-hand leg of an inverted U-shaped conduit 16, thence across the top of the entire unit and downwardly along the left-hand leg of conduit 16 and from there to the lower pipe of the intermediate section 26 of the absorber. The inert gas flows upwardly through the section 26 of the absorber and into the sump vessel 31, thence downwardly by means of a vertically extending conduit 36 into the top of the reservoir chamber 33. The top of the reservoir 33 is also connected with the lower pipe of the lower section 27 of the absorber as mentioned above so that the inert gas after flowing across the top of the reservoir passes upwardly through the lower section 27 and upwardly through a vertically extending pipe 37 into the sump 29 from which it flows upwardly through the upper section 25 of the absorber, and thence downwardly through the gas conduit 38 and across the unit back to the gas heat exchanger 18 in which it is conveyed back to the lower portion of the evaporator.

It will thus be seen that the absorption liquid and the inert gas pass in counter-flow through each section of the absorber, when these sections are considered individually, but that the liquid and gases do not flow in ordinary counter-flow when the absorber is considered as a whole. Whereas the liquid flows through the absorber by gravity through the sections 25, 26 and 27 in the order named, the inert gas flows first through the section 26, then through the section 27 and then through the section 25.

This above described construction of the absorber is suitable for use in an air-cooled refrigerating unit. The various horizontal pipes of the sections of the absorber may be provided with heat radiating fins of any known construction to provide an extended surface for heat radiation.

A particular advantage results from the manner in which the inert gas circulates through the absorber. It is a well-known fact that where one part of an absorber operates at a higher temperature than another, the highest temperature prevails at the point where the inert gas coming from the evaporator, which is richly laden with refrigerant gas first comes in contact with the absorption liquid. It is at this point that the greatest absorption takes place. In the construction illustrated this point is in the section 26. For this reason the section 26 may be somewhat larger than the other sections although the invention is not limited to this particular detail. It will be seen, however, that in the arrangement of Figure 1, section 26 is composed of five horizontal pieces of pipe while the sections 25 and 27 have four pieces of pipe each.

If the entire absorber were merely an extended form of the section 26, the absorption liquid leaving the absorber would not be at the maximum concentration possible at the prevailing temperature of the cooling medium for the point where the absorption liquid left the absorber would be much warmer than the temperature of the cooling medium. In accordance with the principles of the present invention therefore, the absorption liquid passing through the conduit 22 is further cooled in the section 27 and brought down to a point very close to that of the cooling medium which is, in this case, the ambient air. This absorption liquid is then again subjected to the inert gas laden with refrigerant and further absorption takes place so that the solution leaving the lower section 27 and passing into the reservoir 23 is as concentrated as it is possible to make.

Likewise the inert gas is carried out of proximity with the warm section 26 of the absorber into the section 25 (after having passed through the lower section 27) and, in the section 25, is subjected to the very weak absorption liquid coming from the gas separating chamber through the conduit 20, thus further absorption takes place in section 25 due to the low concentration of the solution therein, and the prevalence of a temperature in the section 25 which is very close to that of the cooling medium.

It will thus be seen that in the absorber the advantages of both counter-flow and parallel flow as ordinarily executed in absorption refrigerating apparatus are obtained. The gas leaving the absorber comes in contact with the weak absorption liquid at a low temperature and at the same time the strong absorption liquid leaving the absorber is brought into contact with the refrigerant gas at a low temperature just before it leaves the absorber.

While only one embodiment of the invention has been shown and described herein, it is obvious that various changes may be made without departing from the invention or the scope of the annexed claims.

I claim:

1. In absorption refrigerating apparatus, an absorber adapted to cause a liquid to absorb a refrigerant gas out of an inert gas and having a plurality of sections, each consisting of a number of horizontally disposed pipes connected by short vertically disposed pipes to form a tortuous path for the flow of the fluid therein, means for causing the absorption liquid to flow downwardly through the various sections of the absorber by gravity and means for causing the gases to flow first through a central section, then through a lower section and then through an upper section of the absorber thereby causing the absorption liquid to reach a concentration nearly corresponding to that normally prevailing at the temperature of the cooling medium under the pressure existing in the apparatus and also causing the gases to come into contact with weak absorption liquid just before leaving the absorber.

2. In absorption refrigerating apparatus, an absorber having at least three sections each consisting of a conduit having a number of bends to form a tortuous path for the flow of fluids therethrough, means for causing an absorption liquid to flow through said sections in a given sequence and means for causing an inert gas laden with refrigerant gas to be absorbed to flow through said sections in a different sequence, said last mentioned means causing the liquid to meet the gases in one section to form a solution of a given concentration, and meet the gases again in another section at a lower temperature to further increase the concentration and said last mentioned means further causing the gases to come in contact with the weak absorption liquid in still another section.

3. In absorption refrigerating apparatus an absorber having three sections arranged in vertical series so as to provide an upper section, a centrally located section and a lower section and each consisting of a conduit having a number of bends to form a tortuous path for the flow of fluids therethrough, means for causing an absorption liquid to flow through said sections under the influence of gravity and means for supplying inert gas and refrigerant gas to the centrally located section, means for conveying the gases from the centrally located section to the lower section and means for conveying the gases from the lower section to the upper section.

4. In absorption refrigerating apparatus an absorber having three sections arranged in vertical series so as to provide an upper section, a centrally located section and a lower section and each consisting of a conduit having a number of bends to form a tortuous path for the flow of fluids therethrough, means for causing an absorption liquid to flow through said sections under the influence of gravity and means for supplying inert gas and refrigerant gas to the centrally located section, means for conveying the gases from the centrally located section to the lower section and means for conveying the gases from the lower section to the upper section the gases and liquids flowing in counterflow in each of said sections.

5. In absorption refrigerating apparatus an absorber having three sections arranged in vertical series so as to provide an upper section, a centrally located section and a lower section and each consisting of a conduit having a number of bends to form a tortuous path for the flow of fluids therethrough, means for causing an absorption liquid to flow through said sections under the influence of gravity and means for supplying inert gas and refrigerant gas to the centrally located section, means for conveying the gases from the centrally located section to the lower section and means for conveying the gases from the lower section to the upper section the arrangement being such that the upper and lower sections operate at a lower temperature than the centrally located section.

6. In absorption refrigerating apparatus, an absorber having three sections spaced from one another and each including a horizontally disposed pipe providing a surface for bringing an absorption liquid into intimate contact with a refrigerant gas to be absorbed, means for circulating absorption liquids through the first section, the second section and the third section in series and means for circulating a refrigerant gas through said sections first through the second section, then through the third section and then through the first section.

7. In absorption refrigerating apparatus, an absorber having three sections spaced from one another vertically to provide an upper section, a centrally located section and a lower section and each including a number of horizontally disposed pipes providing an extended surface for bringing an absorption liquid and refrigerant gas into intimate contact so that the liquid may absorb the gas, means for circulating an absorption liquid through the upper section, the centrally located section and the lower section under the influence of gravity and means for causing a refrigerant gas to pass through the central section, then through the lower section and into the upper section.

RUDOLPH S. NELSON.